(12) United States Patent
Niederberger et al.

(10) Patent No.: US 10,040,248 B2
(45) Date of Patent: Aug. 7, 2018

(54) AUTOMATIC WELDING MACHINE

(71) Applicant: Leister Technologies AG, Kägiswil (CH)

(72) Inventors: Adolf Niederberger, Kagiswil (CH);
Bruno von Wyl, Kagiswil (CH);
Mathias Frei, Lucerne (CH)

(73) Assignee: Leister Technologies AG, Kägiswil (CH)

( * ) Notice: Subject to any disclaimer, the term of this patent is extended or adjusted under 35 U.S.C. 154(b) by 0 days.

(21) Appl. No.: 15/433,232

(22) Filed: Feb. 15, 2017

(65) Prior Publication Data

US 2017/0239882 A1 Aug. 24, 2017

(30) Foreign Application Priority Data

Feb. 18, 2016 (EP) ..................................... 16156237

(51) Int. Cl.
*B65H 19/00* (2006.01)
*B29C 65/00* (2006.01)
(Continued)

(52) U.S. Cl.
CPC ........ *B29C 66/83413* (2013.01); *B29C 65/02* (2013.01); *B29C 65/10* (2013.01);
(Continued)

(58) Field of Classification Search
CPC ....... B29C 65/02; B29C 65/20; B29C 66/814; B29C 66/8161; B29C 66/82; B29C 66/8221; B29C 66/8362; B29C 66/86532; Y10T 156/18
USPC .................................. 156/502, 583.1, 583.8
See application file for complete search history.

(56) References Cited

U.S. PATENT DOCUMENTS 1,968,881 A * 8/1934 Edwards ................. B65C 1/021
101/27
2,982,069 A * 5/1961 England .................. B29C 65/18
100/2
(Continued)

FOREIGN PATENT DOCUMENTS

DE 33 03 092 A1 10/1983
EP 1 900 501 A1 3/2008

OTHER PUBLICATIONS

European Search Report dated Jul. 20, 2016 for corresponding European Application No. EP 16 156 237.

*Primary Examiner* — Mark A Osele
*Assistant Examiner* — Nickolas Harm
(74) *Attorney, Agent, or Firm* — Renner Otto Boisselle & Sklar, LLP

(57) ABSTRACT

An automatic welding machine for lap welding the edges of plastic webs, comprising a movable supporting frame, a heating device for partially melting the plastic webs, at least two opposing, counter-rotating pressing rollers and/or advancing rollers, at least one of which being driven, and at least one driving device comprising a drive motor and at least one gearbox for driving the pressing and/or advancing rollers, wherein the pressing rollers and/or advancing rollers are driven by the driving device by way of at least one flexible shaft. Furthermore, the gearbox can be implemented as a worm gear mechanism comprising a worm that is seated directly on a motor shaft of the drive motor and two counter-rotating worm gears driven by the worm.

13 Claims, 5 Drawing Sheets

(51) Int. Cl.
 *B29C 65/02* (2006.01)
 *B29C 65/10* (2006.01)
 *B29C 65/20* (2006.01)

(52) U.S. Cl.
 CPC ........ *B29C 66/1122* (2013.01); *B29C 66/435* (2013.01); *B29C 66/816* (2013.01); *B29C 66/822* (2013.01); *B29C 66/8223* (2013.01); B29C 65/20 (2013.01); *B29C 66/814* (2013.01); *B29C 66/8161* (2013.01); *B29C 66/82* (2013.01); *B29C 66/8221* (2013.01); *B29C 66/8362* (2013.01); *B29C 66/86523* (2013.01); *Y10T 156/18* (2015.01)

(56) References Cited

U.S. PATENT DOCUMENTS

| | | | | |
|---|---|---|---|---|
| 3,149,560 A * | 9/1964 | Finke | ................... | A41H 43/04 100/219 |
| 3,944,460 A * | 3/1976 | Karr | ................... | B29C 65/20 100/33 PB |
| 4,172,750 A * | 10/1979 | Giulie | ................... | B29C 65/18 100/137 |
| 4,272,314 A * | 6/1981 | Banai | ................... | B29C 65/20 100/33 PB |
| 5,435,883 A * | 7/1995 | Myers | ................... | B30B 1/12 100/50 |
| 5,653,095 A * | 8/1997 | Stamm | ................... | B65B 13/22 100/32 |
| 6,186,210 B1 * | 2/2001 | Gehde | ................... | B29C 65/10 156/499 |
| 6,805,179 B2 * | 10/2004 | Velasquez | ................... | B32B 37/226 156/353 |
| 7,686,055 B2 | 3/2010 | Gisler et al. | | |
| 2004/0011472 A1 * | 1/2004 | Zurmuhle | ................... | B29C 65/10 156/502 |
| 2015/0239173 A1 * | 8/2015 | Gisler | ................... | B32B 37/0046 156/583.1 |

* cited by examiner

AUTOMATIC WELDING MACHINE

CROSS-REFERENCE TO RELATED APPLICATION

The present application claims priority under 35 USC § 119 to European Patent Application No. 16 156 237.6 filed on Feb. 18, 2016, the entire disclosure of which is incorporated herein by reference.

TECHNICAL FIELD

The invention relates to an automatic welding machine for lap welding the edges of plastic webs, comprising a movable supporting frame, a heating device for partially melting the plastic webs, at least two opposing, counter-rotating pressing and advancing rollers, at least one of which being driven, and at least one driving device comprising a drive motor and at least one gearbox for driving the pressing and advancing rollers.

DESCRIPTION OF THE RELATED ART

Automatic welding machines of the type in question are generally known and used to fuse films made of plastic material, for example, along the overlapping edge regions thereof. The plastic webs are plasticized in the seam region by way of heat input and subsequently compressed under the action of pressure.

Patent application EP 1 900 501 A1 discloses an automatic welding machine for joining laterally overlapping sealing webs. The automatic welding machine comprises a supporting frame, which can be displaced by way of drive rollers, and a heating device supported by the supporting frame for partially melting the plastic webs to be fused. The plastic webs are compressed by way of pressing and advancing rollers that are disposed on the supporting frame and driven by a drive unit.

In practical experience, it has been shown that thin materials (0.1 to 1.0 mm) prove to be particularly prone to the formation of undulations in the fused web during lap welding. A timely response to the formation of undulations by the operator is frequently made more difficult by an impaired view of the welding process. The view is made more difficult by numerous system components disposed directly on the weld seam, such as the heating device, thick pressing and advancing rollers and the pressing device. In addition, the replacement of pressing and advancing rollers, which becomes necessary depending on the desired seam geometry or the degree of soiling of the running surface, proves to be problematic.

SUMMARY

Proceeding from the above-described prior art, it is the object of the invention to propose a convenient automatic welding machine for fusing plastic webs, which grants the operator a good view of the welding process and good accessibility to the pressing and advancing rollers, and which includes design measures to enhance the quality of the welded joint.

This object is achieved according to the invention by an automatic welding machine having the features described herein.

In the automatic welding machine according to the invention for lap welding the edges of plastic webs, the torque provided by a drive unit and the rotational speed are transmitted between a gearbox and the pressing and/or advancing rollers by way of flexible shafts. The at least two pressing and advancing rollers are disposed opposite one another and counter-rotate in relation to one another.

In contrast to a rigid shaft, a flexible shaft is characterized in that the rotational axis at one end of the shaft, for example on a gearbox connection, and the rotational axis at another end of the shaft, for example on a pressing and advancing roller, can be oriented arbitrarily in relation to one another. Flexible shafts are usually composed of multiple layers of wires that are counter-wound helically around one another and rotate in a metal or plastic protective tube. Possible alternative materials are rubber or plastic. Flexible shafts have a preferred direction of rotation, which is dependent on the uppermost layer of the helically wound wires. The flexible shafts are disposed in the automatic welding machine in keeping with the preferred direction of rotation thereof.

By transmitting the rotational speed and the torque via the flexible shafts, the relatively bulky drive device can be spatially separated well from the region between the pressing and advancing rollers, where the plastic webs are fused. The region around the pressing and advancing rollers can remain unobstructed. The rotational axes of the gearbox and of the pressing and advancing rollers do not have to be identical, as is the case with a rigid shaft, but can be disposed parallel or even skew with respect to one another.

The free arrangement of the individual components thanks to the power transmission by way of flexible shafts allows a compact automatic welding machine to be implemented, while enabling a welding process that is easy to view. Another advantage of the automatic welding machine according to the invention is a considerably simplified design, since the torque is transmitted directly from the gearbox to the pressing and advancing rollers. In contrast to alternative methods for transmitting torque between two non-aligned rotational axes (chain sprockets and chains, rigid shafts comprising universal joints, deflection gears), a number of lossy gear elements can be saved when using flexible shafts, and maintenance-free torque transmission can be implemented. A further advantage is the easy accessibility of the freely arranged pressing and advancing rollers, which allows for rapid and simple replacement of the pressing and advancing rollers, depending on the desired seam geometry.

Both the pressing rollers and the advancing rollers can be driven by a respective flexible shaft. However it is also conceivable that only one roller, either the pressing roller or the advancing roller, is driven, while the other roller remains driveless, or again both the pressing rollers and the advancing rollers are driven, only one of these being driven by way of a flexible shaft.

A preferred and most advantageous embodiment of the automatic welding machine provides for both the pressing rollers and the advancing rollers to be driven, and more particularly by a respective flexible shaft.

A further advantageous embodiment of the automatic welding machine provides that in the driving device, which comprises a drive motor and at least one gearbox, the gearbox disposed between the drive motor and the flexible shafts is designed as a worm gear mechanism. The worm gear mechanism essentially comprises a shaft provided with a convolution, known as the worm, and at least two (helical) gear wheels meshing in the worm, known as worm gears. In a preferred embodiment of the automatic welding machine, the two worm gears have the same gear ratio and are disposed on opposing ends of the worm, whereby synchronous, but opposed rotational movements of the worm gears are ensured. In one embodiment of the automatic welding machine in which the diameters of the pressing and advancing rollers deviate, the rotational speed of the flexible shafts can be adapted by an appropriate adjustment of the gear ratios of the worm gears.

The worm can be driven directly by a drive shaft of the drive motor, while the flexible shafts are joined to the worm gears in a torsion-proof manner. This arrangement automatically supplies the correct opposite rotational directions for the pressing and advancing rollers disposed opposite one another. At the same time, a high gear reduction is implemented in one step between the drive motor speed and the shaft speed by way of the worm gear mechanism. Moreover, a worm gear mechanism is characterized by a high mechanical load-bearing capacity and particularly low-noise operation. So as to achieve an even higher gear ratio than is possible solely by way of the worm gear mechanism, an additional gear, such as a planetary gear, can be disposed between the motor and the worm gear mechanism.

In a further expedient embodiment of the automatic welding machine, the movable supporting frame comprises stable booms corresponding to the number of pressing and advancing rollers. At the ends, the booms each carry a pressing roller and an advancing roller. The opposing pressing and advancing rollers are separated by the plastic webs running therebetween, which are to be fused to one another. Accordingly, at least one boom is disposed on one side of the plastic web, while at least one other boom extends on the opposite side of the plastic webs to be fused. It has proven advantageous for at least one boom to be rigidly and immovably connected to the movable supporting frame, while the at least one opposing boom is disposed on the supporting frame in a vertically pivoting manner. Pivoting of the pivotably disposed boom allows a gap between the opposing pressing and advancing rollers to be closed, and the plastic webs located therebetween to be clamped for fusing. It is also possible, of course, for the two arms to be pivotable.

A further preferred embodiment of the invention is characterized in that the stable booms comprising the pressing and advancing rollers are designed to be hollow at the ends and to each accommodate a flexible shaft in the interiors thereof. The shafts are accommodated in a low-friction manner in the hollow booms, so that there is no interference with the rotation thereof. The automatic welding machine can thus have a particularly compact design, and the flexible shafts are guided in a stable manner in the bent positions thereof. The hollow booms can have either a closed or open, C-shaped cross-sectional geometry, as long as stable guidance of the flexible shafts is ensured.

A further advantageous embodiment of the automatic welding machine provides for a tensioning device for generating a tension force between the opposing pressing and advancing rollers. It has been found to be expedient to dispose the tensioning device on booms disposed pivotably on the supporting frame. By pivoting the boom, the gap between the opposing pressing and advancing rollers is first closed, and then the tension force is built. The pivotable boom is pivoted via an actuating lever. To this end, a rotational angle that the actuating lever traverses is converted into a smaller rotational angle of the tensioning device and of the pivotable boom connected to the tensioning device in a torsion-proof manner by way of eccentric mounting of the actuating lever on the tensioning device.

In a preferred embodiment of the invention, the tensioning device is based on a spring-loaded element, such as a tension spring in the form of a helical spring, and is operated by way of the actuating lever, in the same manner as the pivoting of the pivotable boom. With respect to the axis of force, the spring-loaded element is connected to the actuating lever eccentrically with respect to a fulcrum of the actuating lever. By shifting the actuating lever from a position in which the pressing and advancing rollers are open with respect to one another into a position in which the pressing and advancing rollers are closed, the spring-loaded element is compressed and a corresponding spring force is built. The built spring force acts as torque for the pivotable boom and generates the necessary tension force between the opposing pressing and advancing rollers. The tension force of the tensioning device can be varied by way of a preload of the spring-loaded element and/or by replacing the spring-loaded element, and can thus be adapted to the material to be fused, to different web thicknesses, and to the pressing and advancing rollers used.

For better handling, in particular when replacing the pressing and advancing rollers, or when placing the automatic welding machine on the plastic webs to be fused to one another, the tensioning device can be locked in the open and closed positions of the opposing pressing and advancing rollers. For this purpose, an axis of action of the spring-loaded element in which the spring force acts traverses the fulcrum of the actuating lever in the respective end position of the actuating lever. In this way, a force expenditure acting counter to the spring force is necessary to move the actuating lever back out of the end position.

In a further embodiment, the heating device disposed on the movable supporting frame is designed as a hot air blower comprising a hot air nozzle oriented at the seam region of the plastic webs to be fused. The hot air stream can either be directed uniformly distributed along the seam region at the material to be fused or focused in certain spots by multiple nozzle openings, which are distributed across the width of the hot air nozzle.

As an alternative to the hot air blower, the heat input into the material to be fused can also take place by way of a hot wedge. In this case, the hot wedge is disposed in a feed device between the plastic webs to be fused and, prior to starting the welding process, must be moved to the seam area and locked in this position.

A combined heating device comprising both a hot air blower and a hot wedge in an automatic welding machine is advantageous since this allows a broader selection of plastic materials in terms of the material and web thickness to be processed by way of an apparatus.

By shifting the actuating lever into the end position, in which the opposing pressing and advancing rollers are closed, the respective heating device is moved to the plastic webs to be fused. To this end, the heating device is movably (for example pivotably or linearly displaceably) disposed on the supporting frame and brought into the welding position and out-of-welding position by way of a lever eccentrically connected to the actuating lever.

The tensioning device allowing one-handed operation by way of the actuating lever thus moves the opposing pressing and advancing rollers to the plastic films, applies the necessary pressing pressure, and prompts for the potentially present heating device to be extended. The combination of these steps simplifies the operation of the automatic welding machine.

So as to reduce the formation of undulations in the fused plastic webs, pressing and advancing rollers having a smaller diameter have proven particularly advantageous. Small roller diameters keep the material lift low during the welding process, and successfully reduce the formation of undulations. Thanks to the movable shafts, a particularly compact design of the automatic welding machine can be implemented, and the pressing and advancing rollers are spatially separated from the bulky gearbox. In a preferred embodiment of the automatic welding machine, the diameter of the pressing and advancing rollers is thus no more than 25 mm, and preferably is between 20 mm and 25 mm.

The opposing pressing and advancing rollers usually have the same diameter, and thus the same rotational speed; however, it is also conceivable to use deviating roller diameters having appropriately adapted rotational speeds. In one embodiment of the automatic welding machine, in which the pressing and advancing rollers have differing diameters, it is sufficient if only the roller that lifts the plastic webs meets the above criterion with respect to the diameter.

In order to further mitigate the formation of undulations, the longitudinal axes of the pressing and advancing rollers can be wider than the width of the weld seam, whereby the transport of the plastic webs can be improved in that driving takes place in the cold, solid region of the plastic webs.

A preferred embodiment of the invention provides for the drive motor of the drive unit to be designed as a pancake motor. This is preferably a brushless direct current motor operated by way of direct current.

BRIEF DESCRIPTION OF THE DRAWINGS

The invention will be described hereafter in more detail based on one exemplary embodiment that is illustrated in the drawings. Additional features of the invention will be apparent from the following description of the exemplary embodiment of the invention in conjunction with the claims and the accompanying drawings. The individual features of the invention can be implemented either alone or as several together in different embodiments of the invention. In the drawings:

DETAILED DESCRIPTION OF THE INVENTION

Figure 1:
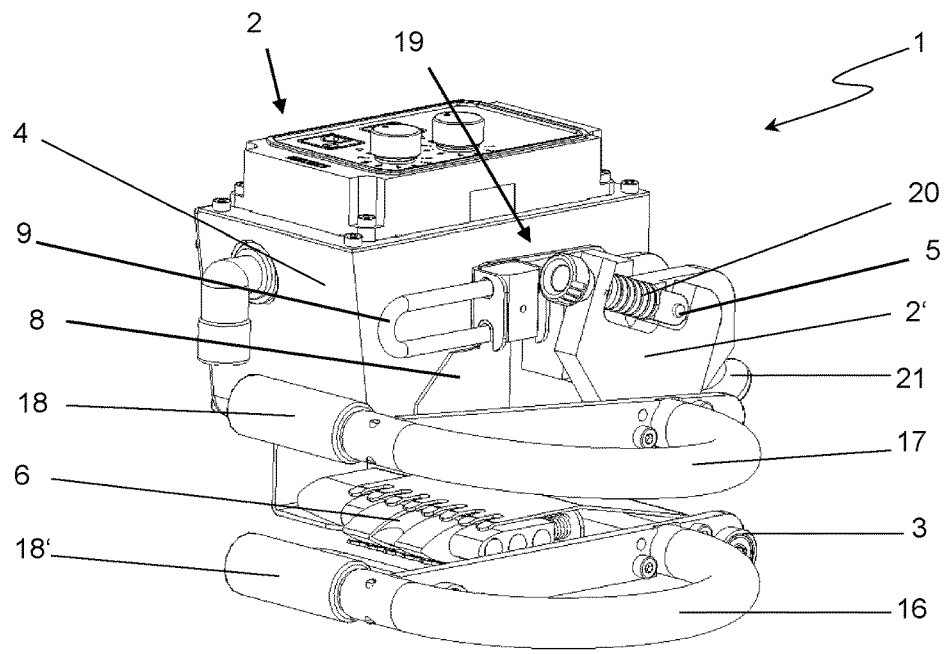
FIG. 1 shows an isometric representation of the automatic welding machine according to the invention, comprising opposing pressing and advancing rollers, in an open position.

FIG. 1 shows an automatic welding machine 1 according to the invention for lap welding edges of plastic webs, which are not shown in the drawing. The illustrated automatic welding machine is the preferred embodiment, in which the pressing and advancing rollers 18 and 18' are each driven by way of a flexible shaft 15, 15'. A supporting frame 2 of the automatic welding machine 1 is displaceably supported on drive rollers 3. The supporting frame 2 comprises a housing 4, which houses a driving device, which is not shown in the drawing, comprising a drive motor 10 and at least one gearbox 12. A pillow block, which is not visible and forms part of the supporting frame 2, is also provided on the housing 4 or on the supporting frame 2 and the tensioning device 19 is mounted and fixed thereon. A supporting element 2', on the side of which two booms 16, 17 are disposed, also forms part of the tensioning device 19. The lower, fixed boom 16 is connected to the supporting element 2' in a torsion-proof manner, while the upper, pivotable boom 17 is mounted rotatably in a vertical plane to the supporting frame 2 by way of the supporting element 2'. The two booms 16, 17 are U-shaped and, at the free ends thereof, each carry a pressing roller 18 and an advancing roller 18'. The pressing and advancing rollers 18 and 18' are characterized by a relatively small diameter of less than 25 mm, and the diameters thereof preferably range between 20 mm and 25 mm. The booms 16, 17 are hollow and, in the insides thereof, each guide a flexible shaft 15, 15', which is not shown in the drawing, from a connection to the gearbox 12 to the pressing and/or advancing rollers 18, 18'.

By pivoting the pivotable boom 17, a gap between the pressing and advancing rollers 18 and 18' is closed, and the plastic webs disposed therebetween are clamped for the welding process. The pivotable boom 17 is pivoted by way of an actuating lever 21 disposed on the supporting element 2', wherein the pivotable boom 17 is connected in a torsion-proof manner to the supporting element 2'. A spring-loaded element in the form of a helical spring 20 is fastened to the supporting element 2' at one end. The other end is mounted on the actuating lever 21, so as to be rotatable about a rotational axis 5 extending parallel to the rotational axis 7 of the actuating lever 21. As a result of the eccentric mounting of the spring-loaded element 20 on the actuating lever 21, a rotational angle that the actuating lever 21 traverses is converted into a smaller rotational angle of the supporting element 2' and of the pivotable boom 17 connected to the tensioning device in a torsion-proof manner. By shifting the actuating lever 21 from a position in which the opposing pressing and advancing rollers 18 and 18' are open with respect to one another into a position in which the opposing pressing and advancing rollers 18 and 18' are closed, the tension spring 20 is compressed and a corresponding spring force is built. The spring force built acts as torque for the supporting element 2', and thus for the boom 17 rigidly connected thereto, which rotates about the rotational axis 24, and generates the necessary tension force between the opposing pressing and advancing rollers 18 and 18'. The tension force of the tensioning device 19 can be varied by way of a preload of the tension spring 20 and/or by replacing the tension spring 20 and can thus be adapted to the material to be fused, different web thicknesses, and the pressing and advancing rollers 18 and 18' used.

FIG. 1 furthermore shows a heating device comprising a hot wedge. In the illustrated embodiment, the hot wedge 6 is mounted linearly movably on the supporting frame 2 by way of a heating element carrier 8 and, for the welding process, must be moved to a weld seam between the pressing and/or advancing rollers 18, 18'. The position of the hot wedge is likewise controlled by way of the actuating lever 21. To this end, the hot wedge 6 is connected via a lever 22 to the actuating lever 21, wherein the lever 22 is rotatably connected to the actuating lever 21, eccentrically with respect to the fulcrum 5 of the same. The heating element carrier 8 is thus moved linearly along the guide 9, as is apparent from a comparison of the position of the hot wedge 6 in FIGS. 4a, 5a and 6a. As an alternative or in addition, the heating device 6 can be implemented with a hot air blower, which is not provided in the illustrated embodiment, and a hot air nozzle directed at the plastic webs to be fused together.

The actuating lever 21 has two end positions. FIG. 1 shows the actuating lever 21 in an open end position, in which the opposing pressing and advancing rollers 18 and 18' have a gap between one another and the hot wedge is located at a maximum distance from the pressing and advancing rollers 18 and 18'. This position is suitable in particular for aligning the plastic webs to be fused and/or for replacing the pressing and/or advancing roller 18 and 18'.

Figure 2:
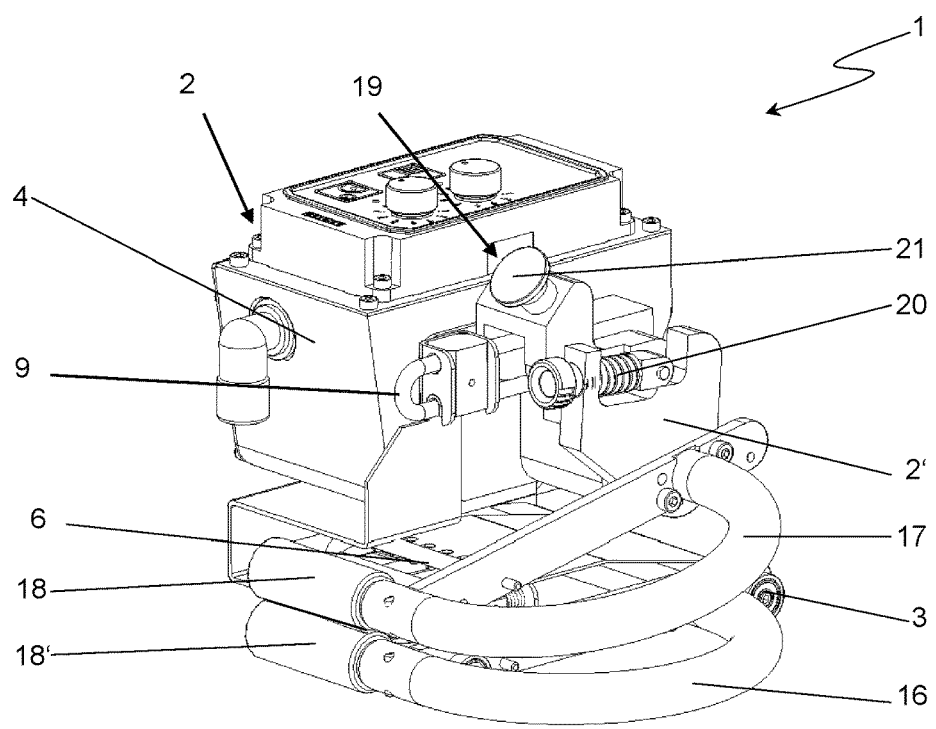
FIG. 2 shows an isometric representation of the automatic welding machine according to the invention, comprising opposing pressing and advancing rollers, in a closed position and with a pressing force applied.
Figure 3A:
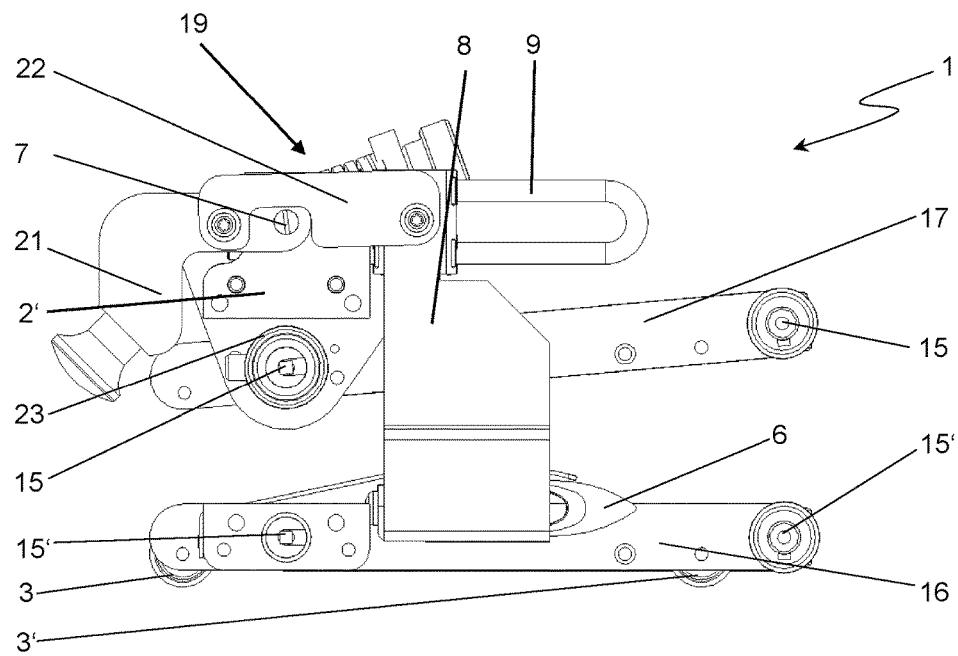
FIG. 3*a* shows a schematic representation of the automatic welding machine according to the invention, comprising opposing pressing and advancing rollers, in an open position.
Figure 3B:
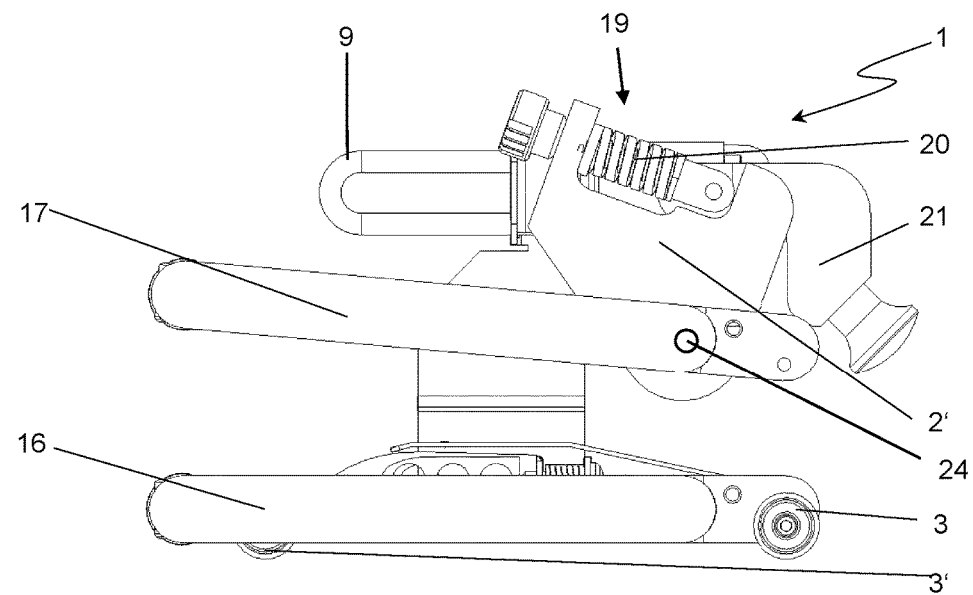
FIG. 3*b* shows a view of FIG. 3*a* rotated 180°.

FIG. 2 shows the automatic welding machine 1 described in FIG. 1, however with the actuating lever 21 shifted into another end position. In this position, the opposing pressing and/or advancing rollers 18, 18' are closed. The plastic webs to be fused, which are not shown in the drawing, are located between the pressing and/or advancing rollers 18, 18' in this end position. The tension spring 20 is maximally tensioned and exerts a torque on the pivotable boom 17, so that an appropriate pressing force is present between the pressing and/or advancing rollers 18, 18'. The hot wedge has been moved to the seam region of the plastic webs to be fused together. The actuating lever 21 is locked in this end position. Flexible shafts 15 and 15', which are not visible in the illustration, extend in the hollow booms 16, 17 and drive the pressing roller 18 and advancing roller 18' in opposite directions, so that the automatic welding machine 1 can be displaced on the drive rollers 3 disposed on the supporting frame 2 along the plastic webs.

Figure 4A:
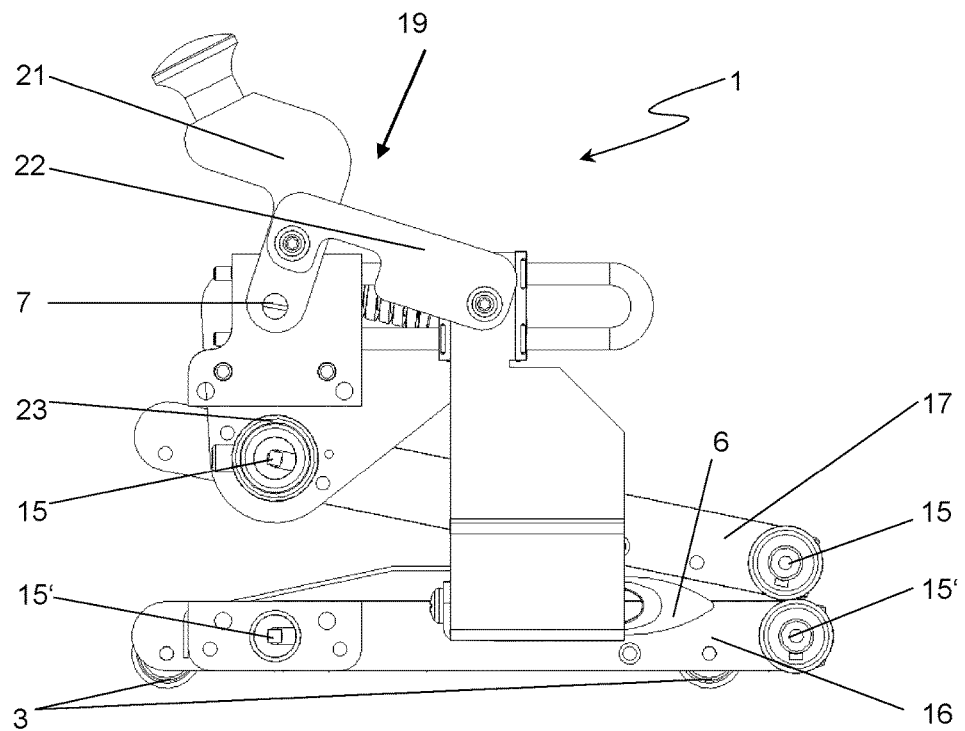
FIG. 4*a* shows a schematic representation of the automatic welding machine according to the invention, comprising opposing pressing and advancing rollers, in an intermediate position.
Figure 4B:
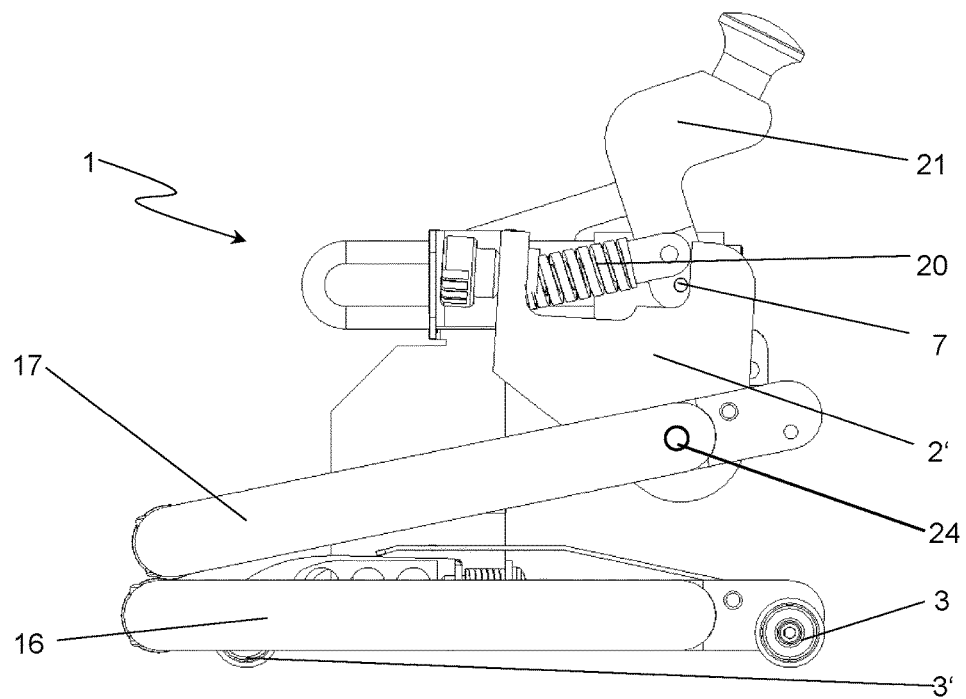
FIG. 4*b* shows a view of FIG. 4*a* rotated 180°.
Figure 5A:
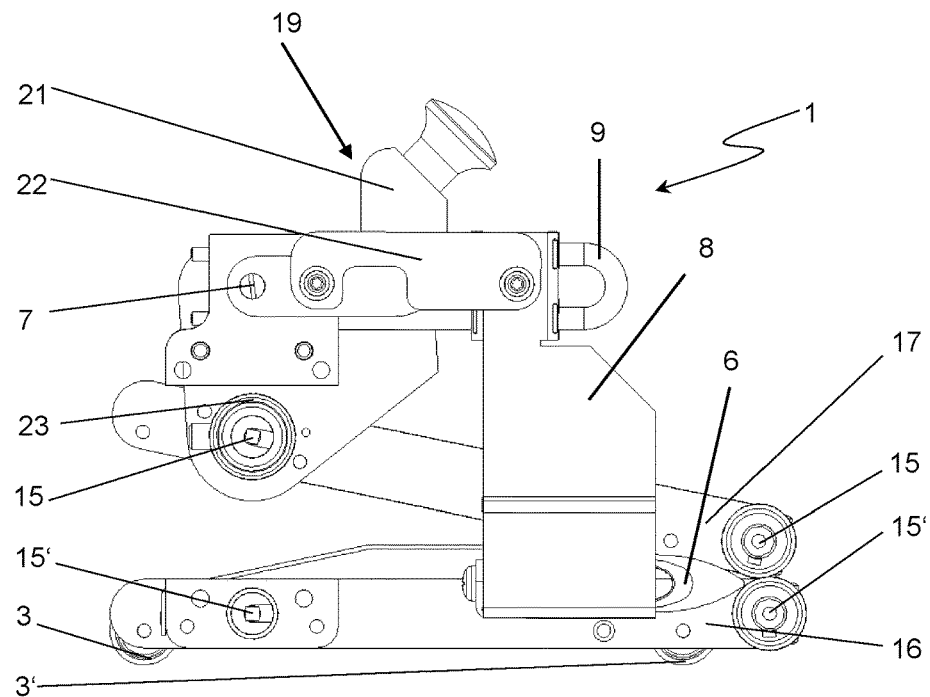
FIG. 5*a* shows a schematic representation of the automatic welding machine according to the invention, comprising opposing pressing and advancing rollers, in a closed position with an extended hot wedge.
Figure 5B:
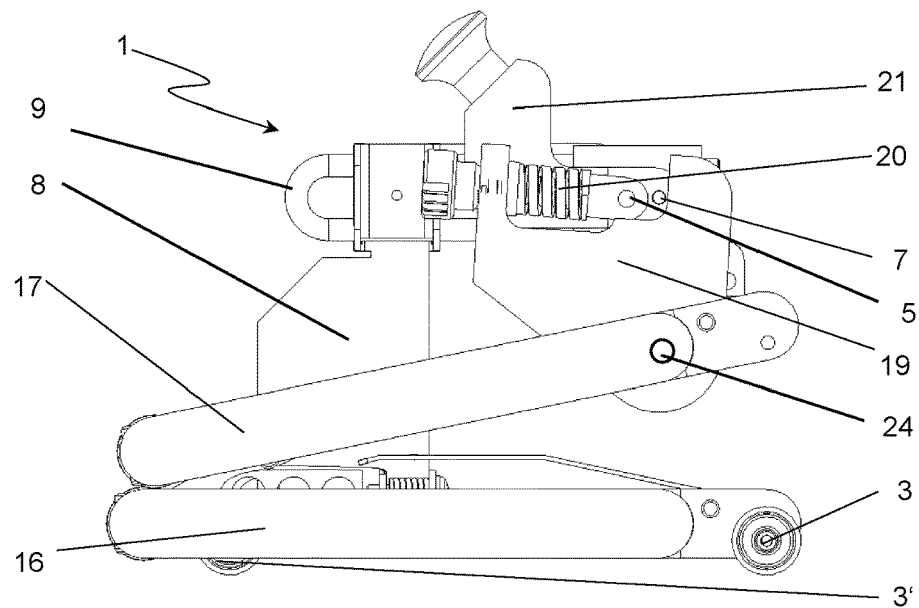
FIG. 5*b* shows a view of FIG. 5*a* rotated 180°.

FIGS. 3a to 5b show the automatic welding machine 1 according to the invention in a schematic sectional illustration. For the sake of improved clarity, the housing 4 is not shown. The figures, in pairs, each show a position of the automatic welding machine 1. The individual pairs of figures differ from one another by the position of the actuating lever 21. Proceeding from the open position of the pressing and/or advancing rollers 18, 18' shown in FIGS. 3a and 3b, FIGS. 4a and 4b show the actuating lever 21 in a position between the two end positions, in which the pressing and/or advancing rollers 18, 18' are closed, but with no tension force yet applied, while FIGS. 5a and 5b show the end position in which the pressing and/or advancing rollers 18, 18' are closed and a tension force is applied by the compressed tension spring 20.

The hollow booms 16 and 17 each guide a flexible shaft 15 and 15' in the insides thereof. The pivotable boom 17 and the tensioning device 19 are pivotably connected to the housing 4, which is not shown in these drawings, by way of a swivel joint 23, wherein a flexible shaft 15 is guided by the swivel joint 23 into the pivotable boom 17.

As was already described above, the actuating lever 21 is pivotably disposed on the fulcrum 5 thereof so that the eccentric arrangement of the helical spring 20 on the actuating lever 21 causes the above-described movement of the pivotable boom 17. The individual steps are shown in FIGS. 3, 4, and 5. In FIGS. 4a and 4b, the helical spring 9 is bent from start to end, even if this is not clearly apparent from the figures.

In addition, in a specific embodiment, the hot wedge 6 can be moved to the seam region between the closed pressing and/or advancing rollers 18, 18', eccentrically with respect to the fulcrum 5, via the lever 22, as described above, or can be pulled back again when the pressing and/or advancing rollers 18, 18' are opened, when the actuating lever 21 is moved. The control of the two processes is linked for the safety of the operator. This prevents the hot wedge from being extended in the open position of the pressing and/or advancing rollers 18, 18' and located in the region into which the operator reaches, for example when replacing the pressing and/or advancing roller 18, 18'.

As was already mentioned, the actuating lever 21 is automatically locked in the two end positions so as to prevent it from being inadvertently moved out of the particular end position. Locking is achieved by an axis of action of the tension spring 20, in which the spring force acts, traversing the axis of rotation 7 of the actuating lever 21 in the respective end position of the actuating lever 21, thereby necessitating a force that is directed counter to the spring force for moving the actuating lever 21 out of the end position.

Figure 6:
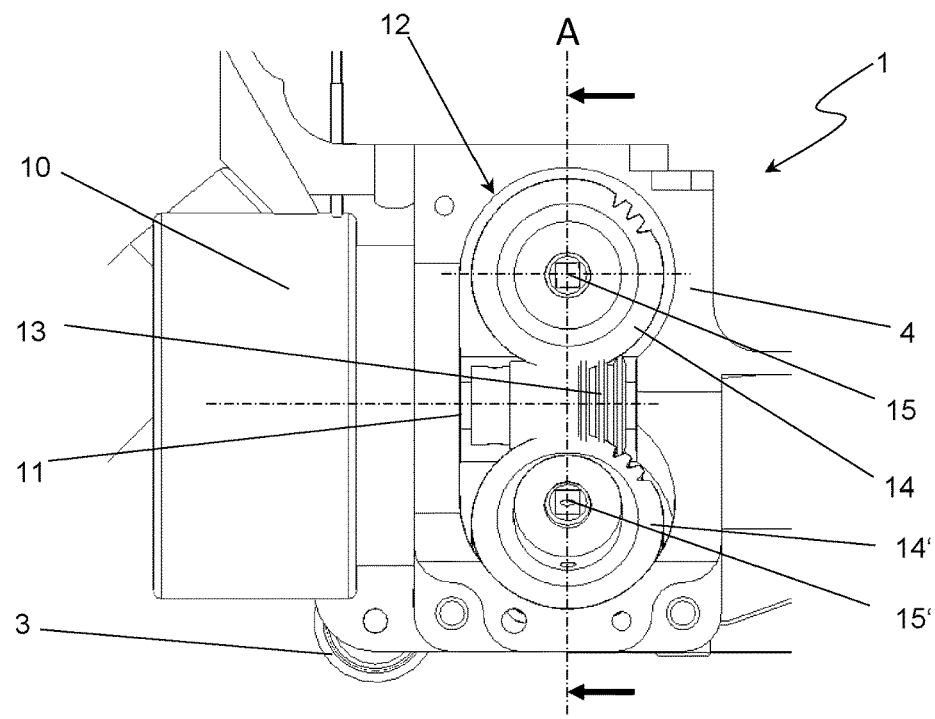
FIG. 6 shows a sectional illustration through the housing of the automatic welding machine according to the invention, comprising a worm gear mechanism.

FIG. 6 shows a sectional illustration through the housing 4 of the automatic welding machine 1 according to the invention. The driving device comprising the associated gearbox 12 is shown. A worm 13 is seated on a motor shaft 11 of a drive motor 10 and drives two worm gears 14, 14'. The worm gears 14, 14' can be disposed separated by the worm 13, opposite one another in a plane or, as shown in the exemplary embodiment, in planes that are inclined with respect to one another. In the illustrated variant, the gearbox 12 composed of the worm 13 and the two worm gears 14, 14' has a particularly low installation height. This results in a particularly compact configuration for the automatic welding machine 1.

Figure 7:
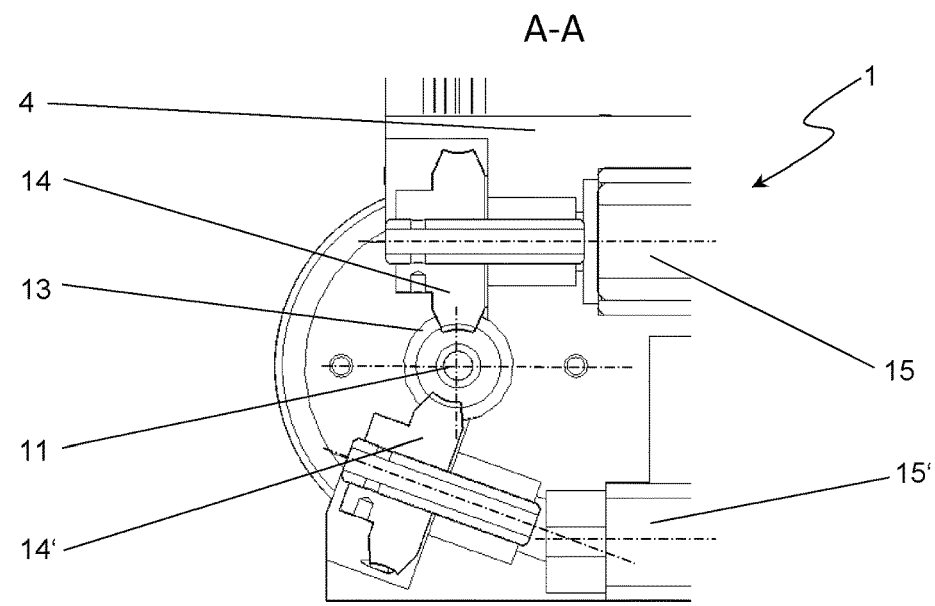
FIG. 7 shows a sectional illustration through the worm gear mechanism of FIG. 6.

FIG. 7 shows a section through the gearbox 12 from FIG. 6. The decrease in the installation height of the gearbox by the tilted plane of the lower worm gear 14' is easily visible. The lower worm gear 14' drives the flexible shaft 15', which is guided by the fixed boom 16, and the upper worm gear 14 drives the flexible shaft 15, which is guided by the pivotable boom 17. The tilted position of the lower worm gear 14' allows the fixed boom 16 and the advancing roller 18' connected thereto to be disposed particularly low on the automatic welding machine 1, so that, together with the small diameter of the pressing and/or advancing rollers 18, 18', lifting of the plastic webs to be fused together can be minimized.

Although the device has been shown and described with respect to certain embodiments, it is obvious that equivalents and modifications will occur to others skilled in the art upon the reading and understanding of the specification. The device includes all such equivalents and modifications, and is limited only by the scope of the following claims.

The invention claimed is:

1. An automatic welding machine for lap welding edges of plastic webs, comprising a movable supporting frame, a heating device for partially melting the plastic webs, at least two opposing, counter-rotating rollers, at least a first one of the rollers being an advancing roller and at least a second one of the rollers being a pressing roller opposing the advancing roller, wherein each of the advancing roller and the opposing pressing roller is connected by means of a respective flexible shaft to a driving device driving the rollers, wherein the driving device comprises a drive motor and at least one gearbox for driving the pressing roller and the advancing roller, and the at least one gearbox is designed as a worm gear mechanism, the worm gear mechanism comprising a worm and at least two counter-rotating worm gears driven by the worm.

2. The automatic welding machine according to claim 1, wherein the supporting frame comprises an immovable, fixed boom including the advancing roller and a movable, pivotable boom including the pressing roller.

3. The automatic welding machine according to claim 2, wherein the immovable, fixed boom and the movable, pivotable boom are hollow booms and each one accommodates a flexible shaft on the inside.

4. An automatic welding machine according to claim 1, wherein the automatic welding machine comprises a tensioning device for generating a tension force between the opposing pressing roller and advancing roller.

5. The automatic welding machine according to claim 4, wherein a movable, pivotable boom comprises the tensioning device for generating a tension force between the opposing pressing roller and advancing roller.

6. The automatic welding machine according to claim 4, wherein the tensioning device comprises a replaceable, spring-loaded element for setting the tension force and an actuating lever for moving a pivotable boom.

7. The automatic welding machine according to claim 1, wherein a tensioning device is configured to be locked in a position in which the opposing pressing roller and advancing roller are open with respect to one another or in a position in which the opposing pressing roller and advancing roller are closed with respect to one another.

8. The automatic welding machine according to claim 7, wherein an actuating lever is connected to a lever, which in turn is connected to the heating device, so that the heating device can be retracted and extended by way of the actuating lever of the tensioning device.

9. The automatic welding machine according to claim 1, wherein the heating device is designed as a hot air blower comprising a hot air nozzle that is oriented at the plastic webs to be fused and/or as a hot wedge disposed between the plastic webs.

10. The automatic welding machine according to claim 1, wherein the pressing roller and the advancing roller each have a diameter of less than 25 mm.

11. The automatic welding machine according to claim 1, wherein the drive motor is designed as a pancake motor.

12. The automatic welding machine according to claim 11, wherein the pancake motor is a brushless direct current motor operated by way of direct current.

13. The automatic welding machine according to claim 1, wherein the worm gear mechanism is a gear-reducing worm gear mechanism.

* * * * *